United States Patent
Lorenz et al.

[11] 3,717,631
[45] Feb. 20, 1973

[54] 2,4'DIOXO-1,3-BENZOXAZINOTHIONOPHOSPHONIC ACID ESTERS

[75] Inventors: Walter Lorenz, Wuppertal-Cronenberg; Ingeberg Hammann, Cologne, both of Germany

[73] Assignee: Farbenfabriken Bayer Aktiengesellschaft, Leverkusen, Germany

[22] Filed: Sept. 23, 1970

[21] Appl. No.: 74,856

[30] Foreign Application Priority Data

Oct. 7, 1969 Germany.....................P 19 50 492.8

[52] U.S. Cl...............................260/244 R, 424/248
[51] Int. Cl...........................................C07d 87/08
[58] Field of Search........................................260/244

[56] References Cited

UNITED STATES PATENTS 3,467,655   9/1969   Nakanishi..........................260/244 R
2,706,194   4/1955   Morris et al..........................260/244

*Primary Examiner*—Harry I. Moatz
*Attorney*—Burgess, Dinklage & Sprung

[57] ABSTRACT

2,4-Dioxo-1,3-benzoxazinothionophosphonic acid esters which possess arthropodicidal, especially insecticidal or acaricidal, properties. The compounds have the structure

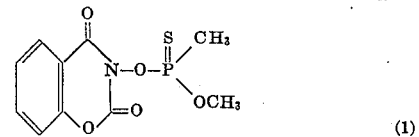

(1)

in which

R and $R_1$ stand for the same or different straight-chain or branched lower alkyl radicals.

5 Claims, No Drawings

2,4'DIOXO-1,3-BENZOXAZINOTHIONOPHOSPHONIC ACID ESTERS

The present invention relates to certain new 2,4-dioxo-1,3-benzoxazinothionophosphonic acid esters, to a process for their preparation, and to their use as insecticides or acaricides.

From published Dutch Patent Application 67/04838 it is already known that 2,4-dioxo-1,3-benzoxazinothionophosphoric acid esters, for example O,O-dimethyl-O-[2,4-dioxobenzoxazino-3-yl]-thionophosphoric acid ester, exhibit insecticidal and herbicidal properties.

The present invention provides 2,4-dioxo-1,3-benzoxazino-thionophosphonic acid esters of the formula

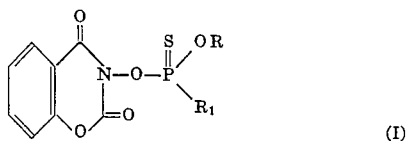

in which

R and $R_1$ stand for the same or different straight-chain or branched lower alkyl radicals.

These compounds have been found to have strong insecticidal and acaricidal properties.

The invention also provides a process for the production of a 2,4-dioxo-1,3-benzoxazinothionophosphonic acid ester of the formula (I) in which 3-hydroxy-2,4-dioxo-1,3-benzoxazine of the formula

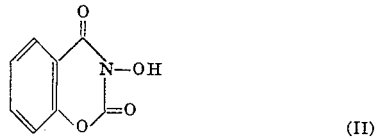

is reacted, either in the form of its alkali metal, alkaline earth metal or ammonium salt or in the presence of an acid-binding agent, with an O-alkyl alkanethionophosphonic acid ester halide of the formula

in which

R and $R_1$ have the meaning stated above, and

Hal stands for a halogen atom.

Surprisingly, the 2,4-dioxo-1,3-benzoxazinothionophosphonic acid esters (I) are distinguished by a considerably better insecticidal and acaricidal activity than the known 2,4-dioxo-1,3-benzoxazinothionophosphoric acid esters of analogous constitution and the same type of activity. The substances according to the invention therefore represent a genuine enrichment of the art.

If, for example, 3-hydroxy-2,4-dioxo-1,3-benzoxazine and O-methyl-methanethionophosphonic acid ester chloride are used as starting materials, the reaction course can be represented by the following formula scheme:

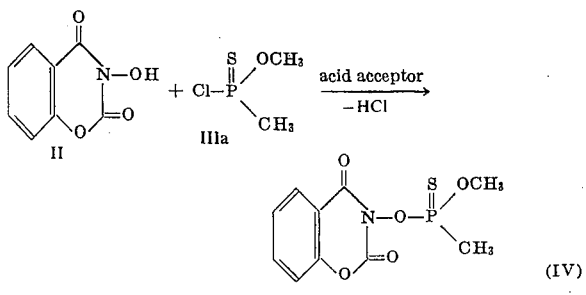

Preferably, R and $R_1$ stand for alkyl radicals with one to four and especially one or two carbon atoms, and Hal stands for a chlorine atom.

As examples of thionophosphonic acid ester halides which can be used in the present process, there may be mentioned: O-methyl-methane, O-ethyl-methane, O-ethyl-ethane, O-methyl-ethane, O-isopropyl-methane, O-isopropyl-isopropane, O-methyl-isopropane, and O-ethyl-isopropane-thionophosphonic acid ester chloride.

The thionophosphonic acid ester halides (III) and 3-hydroxy-2,4-dioxobenzoxazine to be used as starting materials are described in the literature and can be prepared according to known methods.

The reaction of the invention may be carried out in the presence of a solvent which term includes a mere diluent. All organic solvents or diluents are suitable. These include aliphatic and aromatic hydrocarbons, which may be chlorinated, such as benzene, toluene, xylene, benzine, methyl chloride, chloroform, carbon tetrachloride, chlorobenzene; ethers, such as diethyl ether, dibutyl ether, dioxane; ketones, such as acetone, methylethyl ketone, methylisopropyl ketone, methylisobutyl ketone; nitriles, such as acetonitrile; and the like.

As acid acceptors, all customary acid-binding agents are suitable. Particularly suitable have proved to be alkali metal carbonates and alcoholates, for example sodium or potassium carbonate, methylate or ethylate; and aliphatic, aromatic or heterocyclic amines, for example triethylamine, dimethylamine, dimethylaniline, dimethylbenzylamine or pyridine.

The reaction temperatures can be varied within a fairly wide range. In general, the reaction is carried out at from about $-10°$ to $+60°$ C, preferably at $0°$ to $30°$ C.

Usually, the reaction proceeds at normal pressure.

In carrying out of the process, the starting materials may generally be used in equimolar proportion. An excess of one or other of the reactants brings no substantial advantages.

The reaction may be carried out in a suitable solvent in the presence of an acid acceptor, and the reaction mixture may be stirred afterwards for some hours. The mixture may be subsequently poured into acidified water and worked up as usual.

The compounds according to the invention are obtained in most cases in crystalline form; they may be characterized by their elemental analyses and their melting points.

As already mentioned above, the products according to the invention are distinguished by an outstanding insecticidal and acaricidal activity, with only slight phytotoxicity. The pesticidal effect sets in rapidly and is long-lasting. By reason of these properties, the new substances are used in crop protection and the protection of stored products, as well as in the hygiene field, for the control of noxious sucking and biting insects, as well as of mites.

To the sucking insects there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects, above all there should be mentioned butterfly caterpillars (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*); and the like.

Also to be classed with the biting insects are beetles (*Coleoptera*), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*) the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*) and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, *Orthoptera*, for example the house cricket (*Acheta domesticus*); termites such as the eastern subterranean termite (*Reticulitermes flavipes*) and *Hymenoptera* such as ants, for example the garden ant (*Lasius niger*); and the like.

The *Diptera* comprise essentially the flies, such as vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example, mosquitoes such as the yellow fever mosquito (*Aedes aegypti*), the northern house mosquito (*Culex pipiens*) and the malaria mosquito (*Anopheles stephensi*); and the like.

With the mites (*Acari*) there are classed, in particular, the spider mites (*Tetranychidae*) such as the two-spotted spider mite (*Tetranychus telarius = Tetranychus althaeae* or *Tetranychus urticae*) and the European red mite (*Paratetranychus pilosus = Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the new compounds are also distinguished by an outstanding residual activity on wood and clay as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols, (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0005–20 percent, preferably 0.005–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0005–95 percent, and preferably 0.005–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g. about 20–100 percent by weight of the active compound.

Furthermore, the present invention contemplates methods of selectively killing, combating or controlling pests, e.g. arthropods, i.e. insects and acarids, and more particularly methods of combating at least one of insects and acarids which comprises applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella test

Solvent: 3 parts by weight acetone

Emulsifier: 1 part by weight alkylaryl polyglycol ether

To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamondback moth (*Plutella maculipennis*).

After the specified periods of time, the degree of destruction is determined as a percentage: 100 percent means that all the caterpillars are killed whereas 0 percent means that none of the caterpillars are killed.

The active compounds, the concentrations of the active compounds, the evaluation times and the results can be seen from Table 1.

TABLE 1
(Plutella test)

| Active compound (constitution) | Concentration of active compound in percent | Degree of destruction in percent after 3 days |
|---|---|---|
| (A) 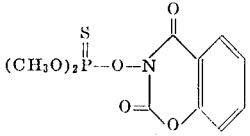 (known) | 0.1 | 0 |
| (1) 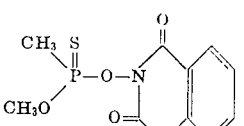 | 0.1<br>0.01<br>0.001<br>0.0001 | 100<br>100<br>100<br>65 |
| (2) 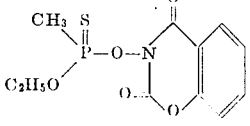 | 0.1<br>0.01<br>0.001 | 100<br>100<br>100 |

Table I—Continued
(Plutella test)

| Active compound (constitution) | Concentration of active compound in percent | Degree of destruction in percent after 3 days |
|---|---|---|
| (3) $\begin{array}{c}C_2H_5\\ \diagdown\\ C_2H_5O\end{array}\!\!\overset{S}{\underset{\parallel}{P}}\!-\!O\!-\!N\!\overset{\displaystyle\diagup}{\underset{\displaystyle O=\diagdown}{}}\!\!\!\!\overset{O}{\underset{O}{\diagdown}}\!\!\!\!\!\diagup$ | 0.1<br>0.001<br>0.001<br>0.0001 | 010<br>100<br>100<br>50 |

EXAMPLE 2

*Phaedon larvae* test
   Solvent: 3 parts by weight acetone
   Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100 percent means that all the beetle larvae are killed. 0 percent means that none of the beetle larvae are killed.

The active compounds, the concentration of the active compound, the times of evaluation and the results can be seen from the following Table 2.

TABLE 2
(Phaedon larvae test)

| Active compound (constitution) | Concentration of active compound in percent | Degree of destruction in percent after 3 days |
|---|---|---|
| (A) $(CH_3O)_2\overset{S}{\underset{\parallel}{P}}\!-\!O\!-\!N$ ... (known). | 0.1 | 0 |
| (1) $\begin{array}{c}CH_3\\ \diagdown\\ CH_3O\end{array}\!\!\overset{S}{\underset{\parallel}{P}}\!-\!O\!-\!N$ ... | 0.1<br>0.01<br>0.001<br>0.0001 | 100<br>100<br>90<br>55 |
| (2) $\begin{array}{c}CH_3\\ \diagdown\\ C_2H_5O\end{array}\!\!\overset{S}{\underset{\parallel}{P}}\!-\!O\!-\!N$ ... | 0.1<br>0.01<br>0.001 | 100<br>100<br>90 |
| (3) $\begin{array}{c}C_2H_5\\ \diagdown\\ C_2H_5O\end{array}\!\!\overset{S}{\underset{\parallel}{P}}\!-\!O\!-\!N$ ... | 0.1<br>0.01<br>0.001 | 100<br>100<br>50 |

EXAMPLE 3

Myzus test (contact action)
   Solvent: 3 parts by weight acetone
   Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentrations of the active compounds, the evaluation times and the results can be seen from the following Table 3.

TABLE 3
(Myzus test)

| Active compound (constitution) | Concentration of active compound in percent | Degree of destruction in percent after 24 hours |
|---|---|---|
| (A) $(CH_3O)_2\overset{S}{\underset{\parallel}{P}}\!-\!O\!-\!N$ ... (known). | 0.1 | 0 |
| (B) $(C_2H_5O)_2\overset{S}{\underset{\parallel}{P}}\!-\!O\!-\!N$ ... (known). | 0.1 | 20 |
| (1) $\begin{array}{c}CH_3\\ \diagdown\\ CH_3O\end{array}\!\!\overset{S}{\underset{\parallel}{P}}\!-\!O\!-\!N$ ... | 0.1<br>0.01 | 100<br>50 |
| (2) $\begin{array}{c}CH_3\\ \diagdown\\ C_2H_5O\end{array}\!\!\overset{S}{\underset{\parallel}{P}}\!-\!O\!-\!N$ ... | 0.1<br>0.01 | 98<br>98 |
| (3) $\begin{array}{c}C_2H_5\\ \diagdown\\ C_2H_5O\end{array}\!\!\overset{S}{\underset{\parallel}{P}}\!-\!O\!-\!N$ ... | 0.1<br>0.01 | 100<br>98 |

The following further examples are set forth to illustrate, without limitation, the process for producing the active compounds according to the present invention.

EXAMPLE 4

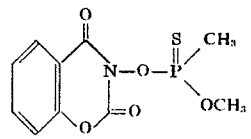

(1)

99 g (0.55 mole) of 3-hydroxy-1,3-benzoaxazine-2,4-dione (prepared according to U.S. Pat. No. 2,714,105; m.p. 235°–236° C) are dissolved in 200 ml of pyridine. To this solution there are added dropwise, while cooling with ice water, 73 g (0.5 mole) of O-methyl-methanethionophosphonic acid ester chloride, at such a speed that an internal temperature of 30° C is not exceeded, and the mixture, after 1 hour's stirring, is poured into water acidified with hydrochloric acid. The initially separating oil very soon solidifies in crystalline form. The crystals are filtered off with suction and washed acid-free. The crude yield of O-methyl-O-[2,4-dioxo-1,3-benzoxazino-(3)-yl]-methanethionophosphonic acid ester is 80 g (55 percent of the theory). By recrystallization from ethanol (1 g/5 ml), the product is obtained in the form of colorless crystals of m.p. 141° C.

|  | N | P | S |
|---|---|---|---|
| Calc. for $C_{10}H_{10}NO_5PS$ (molecular weight 287.2): | 4.87%; | 11.17%; | 10.81%; |
| Found: | 4.91%; | 11.23%; | 10.97%. |

EXAMPLE 5

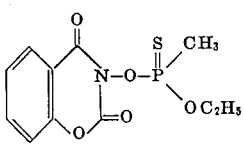

(2)

To a solution of 106 g (0.6 mole) of 3-hydroxy-1,3-benzoxazine-2,4-dione (m.p. 235°–235° C) in 200 ml of pyridine there are added dropwise at a temperature not exceeding 30° C, with ice cooling, 95 g (0.6 mole) of O-ethyl-methanethionophosphonic acid ester chloride, and the mixture, after 1 hour's stirring, is poured into water acidified with hydrochloric acid. The product separating in oily form soon solidifies in crystalline form. The crystals are filtered off with suction and washed neutral. The crude yield of O-ethyl-O-[2,4-dioxo-1,3-benzoxazino-(3)-yl]-methanethionophosphonic acid ester is 155 g (86 percent of the theory). From ethanol (1 g/3 ml), colorless crystals of m.p. 111° C are obtained.

|  | N | P | S |
|---|---|---|---|
| Calc. for $C_{11}H_{12}NO_5PS$ (molecular weight 301.3): | 4.64%; | 10.64%; | 10.28%; |
| Found: | 4.70%; | 10.81%; | 10.47%. |

EXAMPLE 6

In manner analogous with that described above, the compound of the following formula is obtained:

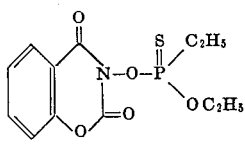

(3)

The crude yield of O-ethyl-O-[2,4-dioxo-1,3-benzoxazino-(3)-yl]-ethanethionophosphonic acid ester is 176 g (93 percent of the theory). By recrystallization from ethanol (1 g/3 ml), the product is obtained in the form of colorless, coarse crystals of m.p. 100° C.

|  | N | P | S |
|---|---|---|---|
| Calc. for $C_{12}H_{14}NO_5PS$ (molecular weight 315.3): | 4.44%; | 10.17%; | 9.82%; |
| Found: | 4.59%; | 10.25%; | 10.17%. |

It will be realized that all of the foregoing compounds contemplated by the present invention possess the desired selective pesticidal, especially arthropodicidal, i.e. insecticidal or acaricidal, properties for combating insects and acarids, and that such compounds have a low phytotoxicity and a correspondingly low mammalian toxicity.

As may be used herein, the terms "arthropod," "arthropodicidal and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. A 2,4-dioxo-1,3-benzoxazinothionophosphonic acid ester of the formula

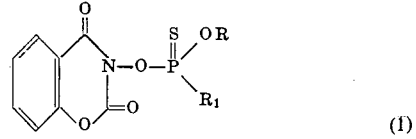

(1)

in which

R and $R_1$ stand for the same or different straight-chain or branched lower alkyl radicals.

2. A compound according to claim 1 in which R and $R_1$ stand for methyl or ethyl.

3. A compound according to claim 1, wherein such compound is O-methyl-O-[2,4-dioxo-1,3-benzoxazino-(3)-yl]-methanethionophosphonic acid ester of the formula

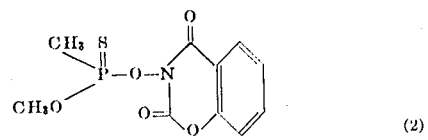

(2)

4. A compound according to claim 1, wherein such compound is O-ethyl-O-[2,4-dioxo-1,3-benzoxazino-(3)-yl]-methanethionophosphonic acid ester of the formula

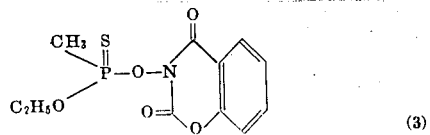

(3)

5. A compound according to claim 1, wherein such compound is O-ethyl-O-[2,4-dioxo-1,3-benzoxazino-(3)-yl]-ethanethionophosphonic acid ester of the formula
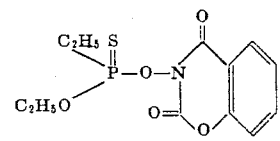
(4)